Feb. 3, 1959    E. J. MILLER    2,872,059
FLAT BED TRAILER HITCHES
Filed June 11, 1957    2 Sheets-Sheet 1
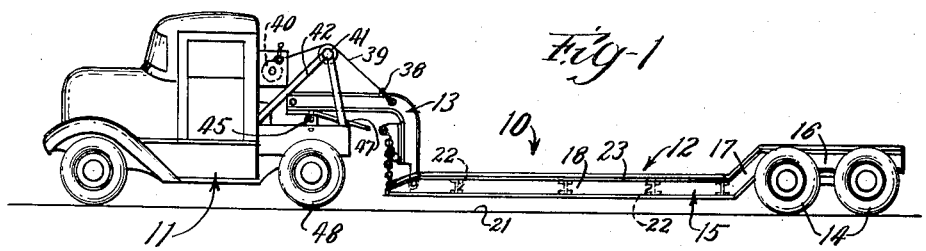
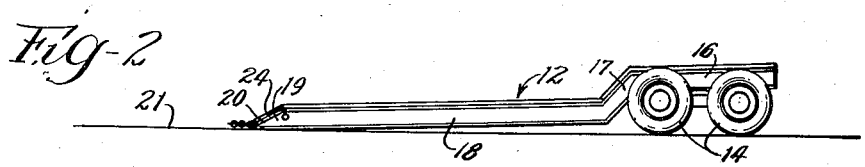
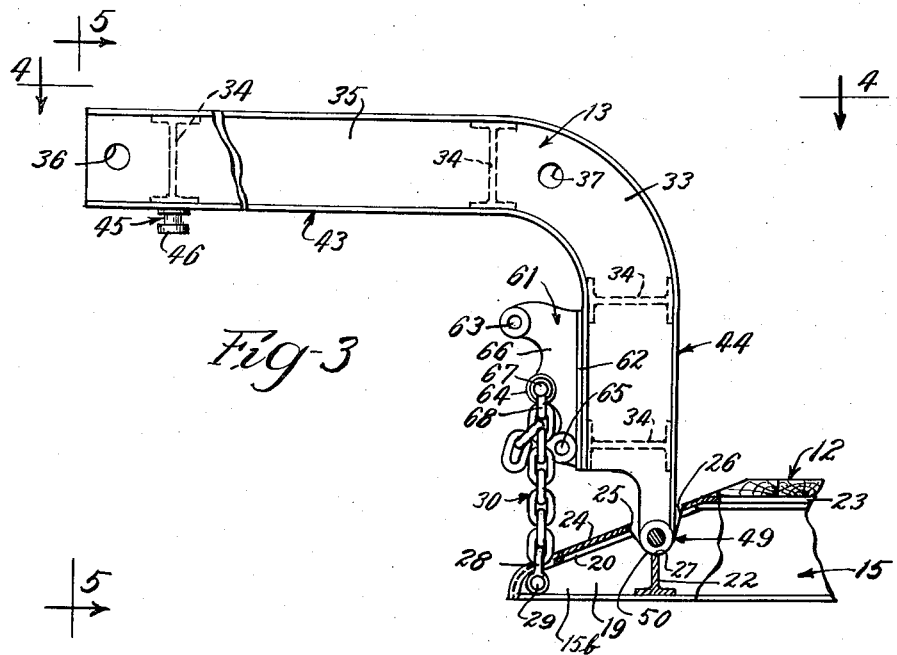
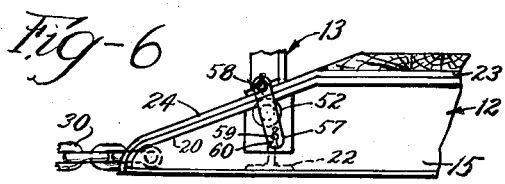
INVENTOR.
Eugene J. Miller
BY
Robert H. Jeudt
Atty.

Feb. 3, 1959 — E. J. MILLER — 2,872,059
FLAT BED TRAILER HITCHES
Filed June 11, 1957 — 2 Sheets-Sheet 2

INVENTOR.
Eugene J. Miller
BY Robert H. Wendt
Atty.

United States Patent Office 2,872,059
Patented Feb. 3, 1959

2,872,059

FLAT BED TRAILER HITCHES

Eugene J. Miller, McHenry, Ill.

Application June 11, 1957, Serial No. 664,976

9 Claims. (Cl. 214—506)

The present invention relates to flat bed trailer hitches for trailers of the type called "Low Boys," having separate rear wheels for rear support, and held up at the front end by a motorized vehicle having a cab and having an arrangement for detachably supporting a trailer.

One of the objects of the invention is the provision of an improved low bed trailer construction in which the forward parts of the bed or deck are tapered on the upper side, forming a ramp which is flat and which increases in height from the ground to the top of the planking at the front end of the bed, so that road rollers or other multi-wheeled machinery may be loaded without the use of planking or blocks to bridge the gap between the ground and the front end of the low bed.

Another object of the invention is the provision of an improved low bed trailer construction in which the front end of the low bed is beveled to form a flat ramp and in which the front is provided with a detachable or removable gooseneck so that the front end of the low bed may be lowered and detached from the gooseneck to get the gooseneck out of the way of the machinery which is to be loaded by driving it up the ramp onto the planking of the low bed.

Another object of the invention is the provision of improved forms of attachment for a detachable gooseneck to the front end of a tapered low bed which forms a ramp and the provision of attachments that may be readily brought into engagement with each other on muddy or uneven ground, without the use of blocks or ramp planks.

Another object of the invention is the provision of an improved mode of attachment of a gooseneck to a low bed having a tapered ramp at its forward edge which permits the low bed to be lowered by means of an auxiliary winch or by means of a hydraulic ram controlling a joint in the gooseneck so that the rear end of the gooseneck may be detached in either case and carried away to leave the ramp unobstructed.

Another object of the invention is the provision of improved arrangements for detachably securing a gooseneck to a low bed trailer having a tapered ramp at its front edge, which arrangements are also effective to secure the gooseneck on the low bed whether the front end of the trailer is on rough or uneven ground or whether it has been deposited in the mud.

Other objects and advantages of the invention will be apparent from the following description and the accompanying drawings, in which similar characters of reference indicate similar parts throughout the several views.

Referring to the three sheets of drawings accompanying this specification,

Fig. 1 is a diagrammatic side elevational view of a trailer pulling unit supporting an improved gooseneck which carries a low bed trailer embodying the invention;

Fig. 2 is a similar view showing the low bed trailer after its forward end has been deposited on the ground and the pulling unit and gooseneck have been removed;

Fig. 3 is a fragmentary side elevational view of one form of gooseneck, shown in connection with the forward end of a low bed trailer having its own ramp;

Fig. 6 is a fragmentary side elevational view of the end of the low bed, showing the details of construction.

Figure 4:
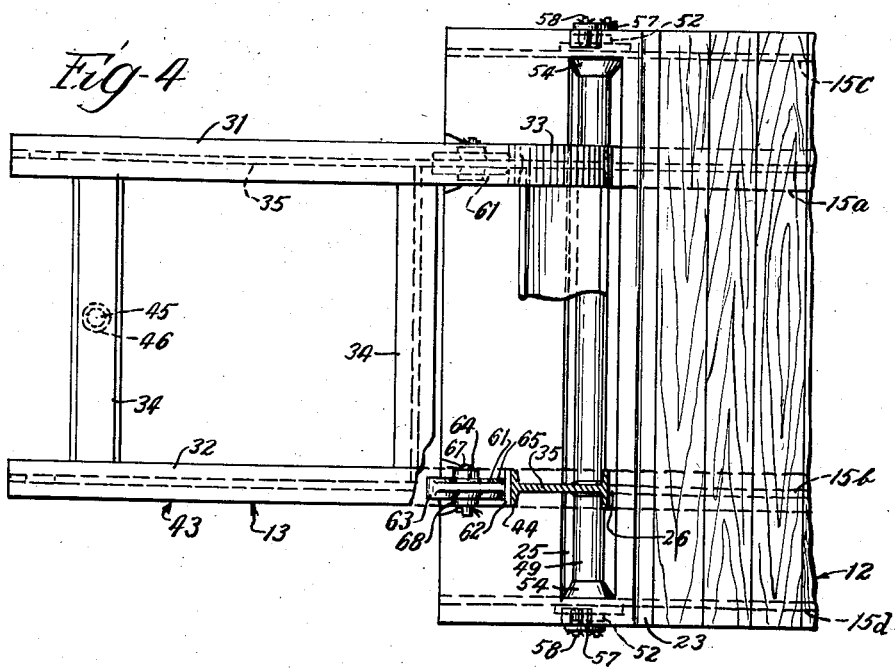
Fig. 4 is a fragmentary top plan view of the gooseneck and trailer parts shown in Fig. 3, taken on the plane of the line 4—4 of Fig. 3.

Referring to Figs. 1 and 2, 10 indicates in its entirety a flat bed trailer assembly which includes the motor vehicle 11 for pulling the trailer, the low bed trailer 12 for carrying the load, and the gooseneck 13 for connecting the low bed trailer to the pulling unit.

The low bed trailer 12 comprises a unit which may have four rear wheels 14 rotatably mounted upon a frame which comprises a plurality of longitudinally extending frame members 15. For example, four such frame members may be employed; and each frame member has an upper horizontal portion 16 for mounting above the wheels a downward offset 17 in front of the wheels and an elongated horizontal portion 18 in front of the offset 17.

The frame members 15 may be in the form of I beams welded together; and at their forward end the web 19 is cut away and beveled on its upper edge; and the upper flange 20 of the I beam is bent downwardly to form a basis for a tapered ramp which leads from the ground 21 onto the low bed trailer.

The longitudinal frame members 15 of the low bed frame are joined together by a multiplicity of transverse I beams 22 located between the longitudinal frame members and welded to them to form a frame which may be rectangular in top plan.

The upper flanges of the I beams, forming the longitudinal frame members 15, may be covered with a thick layer of sheet metal 23 welded to the I beams; and the metal plate may be covered by planking, except at the tapered end, where the ramp 24 is preferably covered by a steel plate, permitting the sliding of the gooseneck on the ramp.

The steel plate 24 is provided with a transversely extending slot 25, which is rectangular in plan, and which is wide enough to provide for a pivotal movement of the gooseneck 13 relative to the low bed trailer 12.

The slot 25 in the metal plate 24, forming the ramp, extends all the way across the ramp and leads to a plurality of tapered grooves 26 in the longitudinally extending frame members 15 below the ramp slot 25.

The grooves 26 have tapered diverging sides to permit the pivotal movement of that end of the gooseneck 13 in the groove; but the grooves are partially cylindrical at their lower part 27, forming a part of a bearing. The two central frame members 15a and 15b are provided with a clevis 28 secured by a bolt 29 to the web 19 in each case; and each clevis carries a heavy chain 30.

The gooseneck 13 may comprise a frame that is made out of a pair of I beams 31 and 32, each of which is bent downward at an angle at 33, and a multiplicity of transversely extending I beams 34 extending between the I beams 31, 32 and welded to them to make a rigid frame for the gooseneck 13.

The web 35 of the gooseneck 13 is provided with an aperture 36 at its front end and another aperture 37 near its bend 33 to permit the attachment of the hook 38 carried by cable 39 of an auxiliary winch 40 mounted on the pulling unit 11 and having its cable passing over a pulley 41 carried by a tripod 42.

This permits the gooseneck to be lifted or pulled, as desired by the user, in manipulating the gooseneck and lifting or lowering the flat bed trailer 12 by means of the gooseneck.

Figure 5:
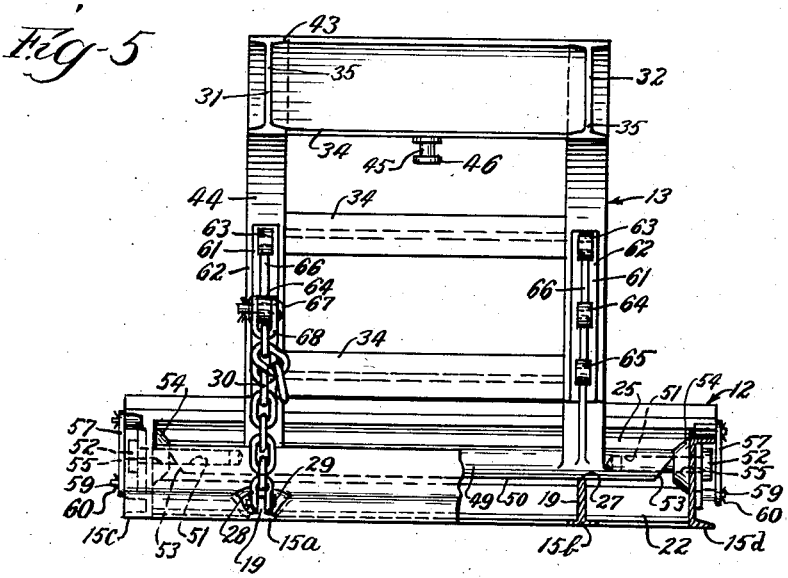
Fig. 5 is a fragmentary rear elevational view taken on the plane of the line 5—5 of Fig. 3, looking in the direction of the arrows.

Referring to Figs. 3 and 5, the gooseneck 13 is provided with a front horizontal portion 43 and a rear downwardly extending portion 44. The horizontal portion 43 is provided with a depending load carrying pin 45, which may be carried by the transverse frame member 34, and which has a disc shaped head 46.

The load carrying pin 45 is adapted to slide up an inclined table 47 above the rear wheels 48 of the pulling unit, and slides into a tapered groove until it is latched at the position 45, shown in Fig. 1.

At its rear end downwardly extending portion 44 terminates in a cross frame member 49, which has a cylindrical lower surface 50 fitting in the groove 27. At each end the frame member 49 has a bore 51 for receiving a pin 52. Frame member 49 is in the nature of a depending elongated lug adapted to be received in the groove 27 and is carried by the depending portion 44.

Frame member 49 extends laterally beyond each of the gooseneck I beams 31 and 32 and has its ends beveled at 53 upwardly and outwardly. The frame member 49 is adapted to be received between the two outer frame members 15c and 15d of the low bed and passes into grooves formed in the two inner I beams 15a and 15b of the low bed frame.

The outer frame members 15c and 15d of the low bed are provided with downwardly tapered lugs 54 secured to the inside of frame members 15c and 15d so that their upper tapered surfaces may guide the frame member 49 on the gooseneck into the proper lateral position. Frame members 15c and 15d and lugs 54 have a through bore 55 in each case for receiving the headed pin 56.

A pin lock 57 may be pivoted at 58 on each of the frame members 15c and 15d and may be secured upon a locking pin 59 by means of a cotter-pin 60 in each case. This is to make sure that the pins 56 cannot pull out of the bores 51.

On its forward side the rear depending portion 44 of each of the I beams 31, 32 of the gooseneck 13 (Fig. 3) have an attachment plate 61. This plate has a flange 62 that is welded to the gooseneck; and it has a plurality of apertures 63, 64, and 65 in an outwardly projecting flange 66.

These apertures are adapted to receive the pin 67 of a clevis 68 on the chain 30; and the chain has extra lengths, permitting the clevis to be adjusted to give the chain different effective lengths. When the chain is adjusted as shown in Figs. 1 and 3, the gooseneck 13, by means of its forward portion 43, is adapted to lift the low bed 12 with the chain 30 in tension and the transverse frame member 49 in compression in the grooves 27.

In addition to these forces tending to secure the gooseneck to the low bed, the pins 56 extend into the frame member 49 at each end and secure it to the frame members 15c and 15d of the low bed trailer.

When not secured by the chain 30, the gooseneck 13 may pivot in either direction on the bolts 52. The chain 30, bolts 52, and elongated frame member 49 all serve to secure the gooseneck 13 rigidly, but detachably, to the low bed trailer 12.

The operation of the trailer hitch is as follows:

The chain 39 of the hoist 40 may be secured by means of its hook in the aperture 36 of the gooseneck 13; and the load pin 45 may then be released.

The pulling unit 11 may then be driven forward; and the horizontal portion 43 of gooseneck 13 will slide down the inclined surface 47, while the low bed trailer 12 stands still, but its forward end drops with the gooseneck 13.

When the low bed trailer 12 has its forward end resting on the ground and the gooseneck 13 has its forward end 43 off the inclined surface 47, the gooseneck will be supported by the winch chain 39. The gooseneck 13 may then pivot counterclockwise in Fig. 3 until the chains 30 are loose. Clevis pins 67 may be withdrawn and the chain 30 detached from the attaching bracket 61.

The pins 56 in the side frame members 15c and 15d may be removed, entirely freeing the gooseneck from the low bed trailer 12. The chains will then lie on the ground on either side; and the pulling unit 11 may move forward with the gooseneck hanging from the cable 39.

When the pulling unit and the gooseneck have been driven out of the way, the low bed trailer will then be in the position of Fig. 2, ready to have any heavy vehicles, such as rollers, graders, etc., driven up its ramp 24 onto the planking. No extra blocks or planking need be used.

Even though the ground is rough, the front end of the low bed with its beveled ramp will provide a convenient support for the rolling vehicles. Even if the low bed is located with its front end in the mud, the slot 27 will not be clogged, or if it is, the mud can be driven out when the frame member 49 on the gooseneck is dropped into place.

After the low bed has been loaded, then the pulling unit 11 is backed up to the front end of the low bed 12, carrying the gooseneck 13, which can be attached to the low bed by the following steps:

First, the gooseneck 13 is manipulated by means of the hoist until its load carrying pin 45 slides up the inclined plane 47 and is locked to the pulling unit 11, as shown in Fig. 1. The gooseneck 13 is then lowered on the ramp 24 of the low bed 12; the pulling unit 11 is backed up, while the frame member 49 slides up the ramp 24 until it drops in the groove 27. The end pins 52 may then be put in from either end, as shown in Fig. 5; and the clearance at 25 and 26 permits the frame member 49 to drop into the groove 27, even though the gooseneck 13 is tilted downward at the back.

The gooseneck and low bed may be lifted to the position of Fig. 1 by means of the hoist 40, which is hooked in the aperture 37; and then the chains 30 may be secured as shown in Fig. 3.

If the low bed is desired at a higher position, the chain is secured at aperture 63. If it is desired at a lower position, the chain is secured at aperture 65. The equipment is then attached and ready to be driven away.

Another mode of attachment is to handle the gooseneck 13 by means of the hoist while its load pin 45 is detached from the pulling unit 11. With the hoist 40 secured at 37 to the gooseneck 13, the gooseneck may be lowered with its frame member 49 into the groove 27. The pins 56 may be inserted from either side; and the chains 30 may be attached while the gooseneck is held in the position of Fig. 3 by the hoist.

The pulling unit 11 may then be backed up with the inclined surface 47 under the horizontal portion 43 of the gooseneck guiding the load pin 45 upward, and lifting the gooseneck and the low bed simultaneously, while the load pin tends to become centered and is finally attached by the usual latching means to the pulling unit 11.

In the event that the frame member 49 does not readily drop into the groove 27 of the low bed, the chains 30 may be attached in their usual manner; and when the gooseneck 13 is lifted, the chains will tend to draw the gooseneck 13 into a central position in which the frame member 49 is ready to drop into the slot or groove 27.

The beveled lugs 54 and the baffle at 53 on the ends of the frame member 49 tend to direct this end of the gooseneck 13 into the groove 27.

The gooseneck 13a may be detached or attached while the low bed is on the ground; and the transverse frame member 49 may be caused to slide up the ramp 24 and may be caused to register with the groove 27 and to drop into the groove by manipulating the pulling unit 11 and the ram 75.

It will thus be observed that I have invented an improved trailer hitch which is adapted to lower the low bed to the ground at the front end, and which has the low bed provided with its own beveled ramp.

The gooseneck is detachable from the low bed so that the pulling unit and gooseneck can be driven away; and the front end of the low bed with its ramp is then ready to receive the vehicles to be loaded on it. The gooseneck can then be reattached to the low bed; and the low bed can be lifted until it is in the proper horizontal position and the gooseneck is properly attached to the pulling unit.

The present mode of attachment between the gooseneck and the low bed does not interfere with the provision of a ramp on the front end of the low bed so that no extra blocking or planking is required.

The present assembly may be quickly attached or detached; and when it is attached, the low bed is firmly secured to the gooseneck and the gooseneck is adapted to pull the load.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A low bed trailer tractor assembly adapted to deposit the front end of the low bed on the ground for loading or connection to tractor with minimum labor, comprising a low bed trailer having a plurality of rear wheels supporting the rear end of a plurality of longitudinally extending beam members, each said beam member having a rear horizontal frame portion mounted above said wheels, a downwardly offset frame portion in front of said wheels, and a forward elongated beam portion extending from the offset portion to a front forwardly tapered end, said beam members being covered and joined by an upper layer of sheet steel welded thereto, all of said beam members being sharply beveled on their upper sides at their forward ends, and the beveled portions being covered with steel ramp plate welded thereto, forming a rising ramp extending from the ground to the top surface of the low bed for use in loading and in guiding a gooseneck tow member, said beveled portions each having an upwardly open rounded apex V groove, forming a partial bearing in each beam spaced from the end of the beam, and said ramp plate having a rectangular slot located above said V groove and providing an elongated bearing slot, a tractor having an inclined load carrying table with a forwardly tapered groove, having securing means for a load pin, a gooseneck tow bar for connecting said tractor and trailer, said gooseneck comprising a frame of beams having a forwardly extending frame portion joined to a downwardly extending portion, said forwardly extending frame portion having a centrally located depending headed load pin adapted to be secured in the said forwardly tapered groove of said load table to permit the gooseneck to pivot on a vertical axis and a horizontal axis relative to the tractor, said downwardly extending portion terminating in a cross frame member, forming an elongated depending bearing lug received in said bearing slot for limited pivotal movement, pivot means for securing said lug in said slot, and tension securing means extending between the end of a plurality of said low bed beams to the front side of said gooseneck at its downwardly extending portion to resist the downward pivotal movement of the low bed on the gooseneck.

2. A low bed trailer-tractor assembly according to claim 1, in which said tractor has a hoist with a drum and cable extending over an upper rear load pulley and adapted to have end of cable secured to gooseneck at its upper rear portion to lift or lower low bed from ground or to ground.

3. A low bed trailer-tractor assembly according to claim 1, in which the latter pivot means comprises a pivot pin extending inwardly through each of the outermost beams of said low bed into a bore in each end of said bearing lug.

4. A low bed trailer-tractor assembly according to claim 3, in which each pivot pin has a pin lock, comprising a depending pivoted plate blocking removal of the pivot pin.

5. A low bed trailer-tractor assembly according to claim 1, in which the tension securing means comprises a pair of chains, each having one end secured by clevis and pin to the end of a low bed beam and the other end adjustably secured to an apertured flange on the gooseneck by removable clevis and pin.

6. A low bed trailer-tractor assembly according to claim 4, in which the apertured flanges are carried by an attachment plate welded to the front of the gooseneck, and each successively higher aperture is located farther from the attachment plate to cause the chain to clear lower parts of the attachment plate flange.

7. A low bed trailer-tractor assembly according to claim 1, in which the gooseneck comprises two flanged beams, each having an easy upper bend, said flanged beams being welded to plural cross beams, forming a rigid angle frame.

8. A low bed trailer-tractor assembly according to claim 1, in which the low bed has a plurality of transverse beams welded under its metal plate and welded at their ends to the longitudinally extending beams.

9. A low bed trailer-tractor assembly according to claim 8, in which there is a half transverse beam with its upper edge located at the bearing surface of said bearing slot and welded to the longitudinal beams below said ramp plate.

References Cited in the file of this patent

UNITED STATES PATENTS

| | | |
|---|---|---|
| 2,389,211 | Pointer | Nov. 20, 1945 |
| 2,489,112 | Talbert | Nov. 22, 1949 |
| 2,553,229 | Barhorst | May 15, 1951 |
| 2,590,181 | Kessler | Mar. 25, 1952 |
| 2,653,827 | Manning | Sept. 29, 1953 |
| 2,784,857 | Duffy | Mar. 12, 1957 |